C. D. STEPHENS.
DEMOUNTABLE RIM AND FELLY BAND.
APPLICATION FILED FEB. 12, 1916.

1,224,511. Patented May 1, 1917.

WITNESSES:

INVENTOR
Charles D. Stephens
By Attorneys,
Fraser, Tuch & Myers

UNITED STATES PATENT OFFICE.

CHARLES D. STEPHENS, OF AUSTIN, TEXAS, ASSIGNOR OF ONE-HALF TO JOSEPH A. BACHMAN, OF AUSTIN, TEXAS.

DEMOUNTABLE RIM AND FELLY-BAND.

1,224,511.  Specification of Letters Patent.  Patented May 1, 1917.

Application filed February 12, 1916. Serial No. 7,820.

*To all whom it may concern:*

Be it known that I, CHARLES D. STEPHENS, a citizen of the United States of America, residing at Austin, in the county of Travis and State of Texas, have invented certain new and useful Improvements in Demountable Rims and Felly-Bands, of which the following is a specification.

This invention has for its object to provide an improved demountable rim particularly adapted for use on automobile wheels, and has for its object to provide a construction of rim which is easily assembled within a tire and easily and quickly removable therefrom, and which requires few tools for its insertion or removal from the tire. A further object of the invention is to provide an improved locking means for locking the rim on the felly band and which means also serve to securely and reliably hold the rim on said felly band and at the same time hold the several sections of the rim together.

In accomplishing the foregoing objects, my invention consists in making the rim of a plurality of sections which are separable one from another, and in providing interlocking means between adjacent sections so arranged that at least one of the said interlocking means shall permit relative movement of the adjacent sections in a radial direction. The invention further consists in the provision of a felly band adapted to receive the rim and which has on its perimeter members for engaging the said locks and not only securing the rim in place on the felly band, but reliably holding the adjacent sections of the rim together when the tire is deflated.

A desirable form in which my invention may be embodied is illustrated in the accompanying drawing, wherein, Figure 1 is a cross-sectional view taken on the line 1—1 Fig. 4, illustrating my improved rim.

Figs. 2 and 3 are cross sections on the respective lines 2 and 3, Fig. 1.

According to my invention, the rim on which the tire is mounted is made in a plurality of sections which are transversely divided. Preferably three sections are employed, whereof one is considerably larger than the others and approximately equal to the other two. These sections when united, provide a complete rim. The invention includes means whereby the several rim sections are locked together, and accordingly, I provide locking means for securing the adjacent ends of the sections. One of these locking means is so constructed as to permit relative radial movement of the connected parts. The locks for other sections are constructed so as to prohibit movement in either radial or lateral direction. All of the sections are held together and provided with temporary stability by the presence of the tire thereon.

The locking means are preferably formed on the inside of the rim and the felly band which receives the rim has corresponding parts on its perimeter which receive the said locking means, and not only hold the rim securely in place on the felly band, but reliably hold the parts of the rim together.

The specific embodiment of my invention illustrated in the accompanying drawings has a rim A which is constructed of a plurality of sections transversely divided, and which as illustrated comprise a large section B which is substantially one half of the total circumference of the rim, and two smaller sections C D, each of which is approximately one fourth of the said circumference.

Figure 1:
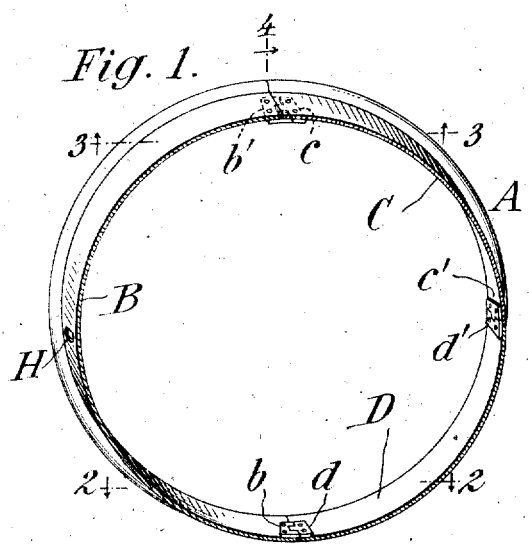
Figure 2:
Figure 3:

The adjacent edges of the several sections are connected together by locking means, and these include blocks which may be attached to the sections, as by being riveted thereto; or could be otherwise attached if desired, as by being welded; or could be made integral therewith. Each of these sections therefore, has two of the said blocks, one being at each end. The meeting or interlocking edges of the blocks are provided with mortise joints. The section B is illustrated as provided with blocks $b$ $b^1$, the section D with blocks $d$ $d^1$, and the section C with blocks $c$ $c^1$. As illustrated, the pairs of blocks $b$ $d$ and $d^1$ $c^1$ are similar and between each of them a mortise joint is formed. This joint is so formed that the tenon in the one block laps over the adjacent rim section: for instance, the tenon in the block $d$ overlaps the rim section B. The walls of the mortise in the block $b$ also overlap the rim section D. By this means, the joint between sections B and D prevents radial or lateral movement of the said connected sections. The joint between rim sections C D is similarly constructed. The joint on the top of Fig. 1 between rim sections B C is also a mortise joint but it is differently arranged than the other joints and is adapted to permit one of the said parts to move radially, relative to the other. To accomplish this, one of the parts of the mortise and tenon joint is made so that it does not overlap the adjacent rim section. As illustrated, the tenon in the block $c$ at its outer end, comes to the edge of the rim section C to which it is attached, and together with the mortise in block $b^1$ prevents relative lateral movement of the connected sections, while permitting relative radial movement. The walls of the mortise in block $b^1$ do however overlap the rim section C and prevent relative radial movement of the parts in one direction. It will therefore be seen that the rim section C at its upper end may move radially so as to break the lock provided by the mortise and tenon joint in order to disassemble.

Figures 4, 5:
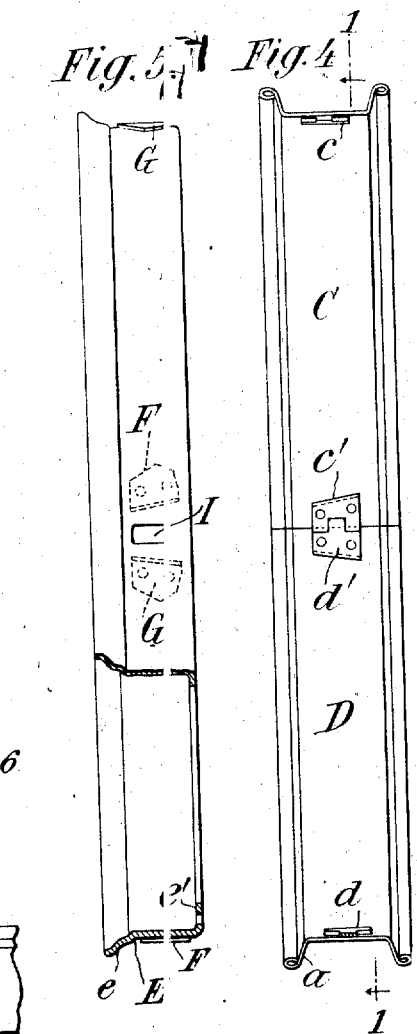
Fig. 4 is a cross section of the said rim on the line 4—4, Fig. 1.
Fig. 5 is an elevation, partly broken, of the felly band.
Figure 6:
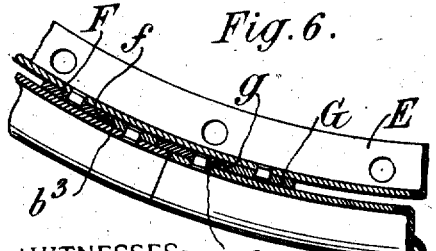
Fig. 6 is a broken detail on the line 6—6, Fig. 2, illustrating a section of the assembled felly band and tire rim.
Figure 7:
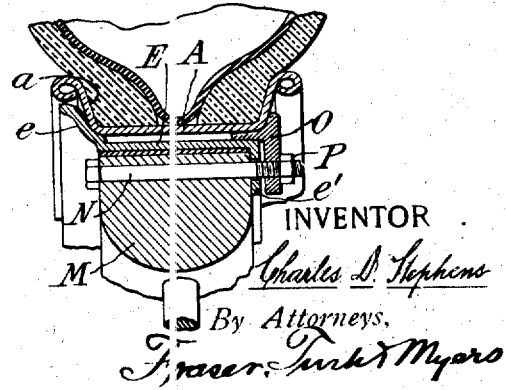
Fig. 7 is a typical cross section of the tire rim in place on the wheel.

The several pairs of blocks $b$—$d$ $b^1$—$c$ and $c^1$—$d^1$ are wedge-shaped or dove-tailed at their outer edges as at $b^2$, $d^2$, and these outer edges are cut under or beveled as seen at $b^3$, $d^3$ Fig. 6. The object of these dove-tailed and cut under edges is to assist in locking the rim to the felly-band as hereinafter explained. The felly-band E is the usual integral band having at one side an outwardly extending flange $e$ and at the other side an inwardly extending flange $e^1$ provided with bolt holes for the bolts which hold the same to the felly. To this band I have added means for receiving and holding the rim blocks which serve not only to hold the rim in place on the band, but to reliably hold the parts of the rim together when the tire is deflated. The said means on the felly band are seen in Figs. 5 and 6. In Fig. 5 the blocks are illustrated in dotted lines in plan. They comprise the blocks F G of which a pair is provided for each of the rim locks. These blocks F G are separated to form a wedge-shaped channel between them adapted to receive the dove-tailed rim blocks, and these felly band blocks are also under cut on their inner edges as seen at $f$ $g$. The blocks are illustrated as riveted to the felly band, but this mode of securing them is not essential as they might be welded in place or integral with the band.

The manner of operating my invention is as follows:

The tire will be presumably the inner tube or pneumatic tire. The inner tube will be placed inside of the tube casing in the usual manner and slightly inflated, as usual after which the casing may be laid upon the floor with the valve stem to the operator's left. The operator should then place the large section B of the rim inside of the casing with end block $b$ to the operator. The valve stem may then be inserted through the hole H of the rim. The section D is then inserted inside of the casing, the lower end containing the block $d$ overlapping the end of the section B and passing over said end about an inch between the said section and the casing. Thereupon, the section C should be inserted in place inside the casing, and the joint $b^1$—$c$ engaged. The section D is then moved up until the joint $c^1$ $d^1$ is properly engaged. The operator may then take any small tool such as a screw driver, and insert same between the blocks $b$ $d$, prying to the left until the joint $b$—$d$ slips into position.

The tire should then be inflated. Before it is fully inflated, the block $b^1$ of the large section B should be tapped to see that the joint is in proper alinement. The rim should not be applied to the felly band or wheel until the tire is well inflated, as the several sections of the rim, while they have sufficient temporary stability to be handled without coming apart, are not held rigidly together until the tire is properly inflated. When this has been accomplished the wheel, which is assumed to be on the car, is jacked up in the usual manner, in order that same may be rotated, thereupon said wheel is rotated until the hole I in the felly band, or wheel, reaches the uppermost point, or thereabouts, whereupon the assembly representing the demountable rim and tire is applied to the wheel, in the following manner.

Apply the inner side of rim A to the wheel, insert the valve stem through the hole I in the felly-band, after which the rim may be placed on the wheel by pushing with the foot against the rim, or tire, at the point opposite the valve stem. The connected pairs of rim blocks entering the channels between the felly-band blocks, and being held there by their respective cut under edges forms a perfectly rigid and united construction comprising the tire, rim and wheel. The assembled construction can then be held in place by the usual bolts N passing through the bolt holes in the flange $e^1$, on which are the usual wedges O. These wedges are held as in the usual manner, by nuts P and force the flanges $a$ and $e$ together and hold the rim in place on the wheel.

To remove the tire, the rim carrying the tire should be removed from the felly-band, which always remains on the wheel, first disengaging from the felly-band, or wheel, at the point opposite the valve stem. The tire should thereupon be deflated, provided same is not already deflated. The assembly, representing the tire and rim should be raised from the floor, or ground, a short distance, perhaps a foot, and holding the same with the part whereon the valve stem is located uppermost, the joint $c^1 d^1$ should then be struck against the floor and immediately the joint $b^1 c$ will separate radially permitting the parts of the rim to drop out of the casing.

It is not intended that the tapered interlocking blocks of the rim should wedge or bind in the channel formed in the felly-band blocks, and the skill of the mechanic easily produces a construction which will not have this effect.

I have illustrated in the accompanying drawing, and have described in the foregoing description the best manner of constructing my invention now known to me; but I do not consider that the said invention is necessarily limited to the particular constructions illustrated, as modifications may be made therefor and equivalent devices substituted for those illustrated and described within the limits of the appended claims, without departing from my invention.

I claim as my invention:—

1. A demountable rim composed of a plurality of transversely divided separable sections, locks between the ends of adjacent sections, one of which permits relative radial movement of said sections, but prevents relative lateral movement, and others of which prevent relative movement of the connected sections in any direction.

2. A demountable rim composed of a plurality of transversely divided separable sections, locks between the ends of adjacent sections and located on the inner wall of said rim, one of which permits relative radial movement of said sections but prevents relative lateral movement, and others of which prevent relative movement of the connected sections in any direction; and an integral felly band adapted to receive said rim and means on the periphery thereof for receiving said locks and securing the rim in place on the said band and reliably holding the sections thereof together.

3. A collapsible tire rim comprising a plurality of separable sections, and means for giving said rim temporary stability comprising blocks on the adjacent parts of the respective sections, and locking joints between the blocks, one of said joints comprising a mortise and tenon so located with respect to the adjacent rim joint that only one of said parts overlaps the adjacent rim section, permitting relative radial movement of said rim sections at said joint, but preventing relative lateral movement of said sections, and the locking joints between the other sections preventing relative radial or lateral movement of the connected sections.

4. A demountable tire rim constructed of a plurality of separable sections and means for assembling said sections comprising blocks on the adjacent edges of the respective sections and mortise joints between adjacent blocks, the mortise and tenon in one of said joints being so located with respect to the adjacent rim joint that only one of said parts overlaps the adjacent rim section and the mortises and tenons in the other joints each adapted to overlap the adjacent rim section.

5. A demountable tire rim constructed of three sections separable on transverse lines, one of which comprises approximately one half of the said rim, and the other two the remainder, blocks on adjacent parts of the respective sections and mortise joints between the blocks, the mortise and tenon in one of said joints being so located with respect to the adjacent rim joint that only one of said parts overlaps the adjacent rim section, and the mortises and tenons in the other joints each adapted to overlap the respective adjacent rim section.

6. A demountable rim composed of a plurality of transversely divided separable sections, projections on the inner sides of said sections adjacent the ends, the respective projections adapted to engage with one another and prevent relative lateral movement of said sections, the projections for one set of adjacent sections adapted to permit relative radial movement of said sections and the projections for another set of adjacent sections adapted to prevent relative radial movement of said sections, a felly-band adapted to receive said rim, and means on the periphery thereof for receiving said rim projections and securing the rim in place on the said band and reliably holding the sections thereof together.

In witness whereof, I have hereunto signed my name in the presence of two subscribing witnesses.

CHARLES D. STEPHENS.

Witnesses:
J. H. HART,
S. A. TIHLQUIST.

Copies of this patent may be obtained for five cents each, by addressing the "Commissioner of Patents, Washington, D. C."